US00RE36750E

United States Patent [19]

Lake, Jr.

[11] E Patent Number: Re. 36,750

[45] Reissued Date of Patent: Jun. 27, 2000

[54] METHOD AND APPARATUS FOR ADDING TEXTURING HIGHLIGHTS TO A VIDEO SIGNAL

[75] Inventor: David E. Lake, Jr., Grass Valley, Calif.

[73] Assignee: The Grass Valley Group, Inc., Nevada City, Calif.

[21] Appl. No.: 07/920,062

[22] Filed: Jul. 27, 1992

Related U.S. Patent Documents

Reissue of:

[64] Patent No.: 4,809,070
Issued: Feb. 28, 1989
Appl. No.: 07/117,261
Filed: Nov. 6, 1987

[51] Int. Cl.[7] ..... H04N 5/14

[52] U.S. Cl. ..... 358/166; 358/37; 358/160

[58] Field of Search ..... 358/21 R, 22, 358/37, 160, 162, 166, 169; H04N 5/14

[56] References Cited

U.S. PATENT DOCUMENTS

| | | | |
|---|---|---|---|
| 4,300,162 | 11/1981 | Robers | 358/160 |
| 4,355,333 | 10/1982 | Sato | 358/160 |
| 4,414,564 | 11/1983 | Hitchcock | 358/166 |
| 4,541,014 | 9/1985 | Yagi | 358/37 |
| 4,658,295 | 4/1987 | Umezawa | 358/166 |
| 4,758,891 | 7/1988 | Hitchcock | 358/166 |
| 4,761,686 | 8/1988 | Willis | 358/160 |

*Primary Examiner*—Mark R. Powell
*Attorney, Agent, or Firm*—John Smith-Hill

[57] ABSTRACT

The central difference along a selected axis through a point (u, v) of a rectangularly-sampled luminance field and at an arbitrary angle α is computed by interpolation. The octant in which the selected axis lies is identified, and first and second pixels through which the lines that limit the identified octant *extend* are identified. The first and second pixels are adjacent each other in the luminance field array and lie on a common ordinate or a common abscissa. [The difference between the luminance values of the first and second pixels is calculated.] Third and fourth pixels, which are symmetrically disposed with respect to the first and second pixels respectively about the point (u, v), are identified[, and the]. *The* difference in luminance values of the *first and* third [and fourth] pixels is calculated, *and the difference in luminance values of the second and fourth pixels is calculated.* The central difference along the selected axis is calculated by applying the MIX operator to the two difference values and a mix ratio coefficient which is the tangent of an angle which is related to α and multiplying the result by a factor proportional to the cosine of that angle.

16 Claims, 3 Drawing Sheets

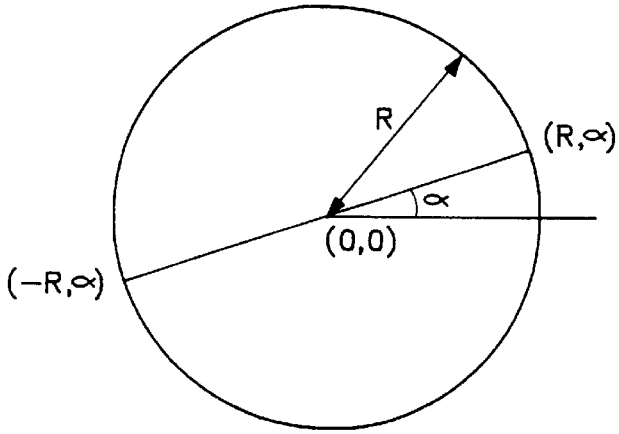
FIG. 1
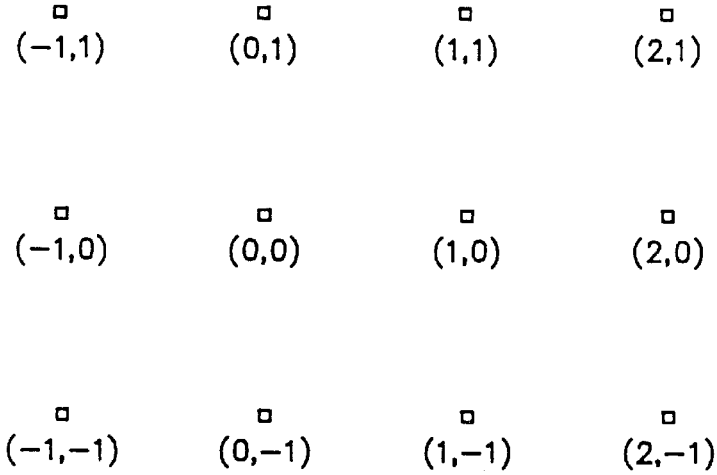
FIG. 2
FIG. 3
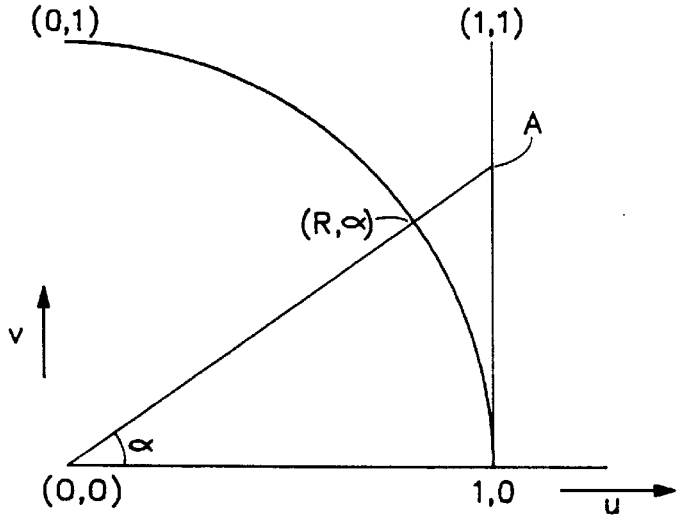

METHOD AND APPARATUS FOR ADDING TEXTURING HIGHLIGHTS TO A VIDEO SIGNAL

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for adding texturing highlights to a video signal.

Among the video effects that can be applied to an array of sample values representing a luminance field to produce an enhanced array which represents a somewhat different luminance field is an effect known as "embossing". Edge information is extracted from an image and is used to add luminance along edges of one polarity and subtract luminance along edges of the opposite polarity. The term "polarity" as applied to an edge is intended to be understood as referring to the sign of the change in luminance across the edge when the edge is traversed in a particular direction. If the luminance increases, the edge is of positive polarity, and if the luminance decreases the edge is of negative polarity. Clearly, an edge that is of positive polarity when traversed in one direction is of negative polarity when traversed in the opposite direction. When luminance is added and subtracted along edges in the original luminance field, the areas of increased and reduced luminance appear to the eye as highlights and shadows which provide three-dimensional cues for the eye and achieve an embossed texture appearance.

The video effect of embossing is currently performed by applying the luminance field array to a 3×3 high pass filter kernel. All coefficients of the kernel are 0 except two which are symmetrically disposed about the central element. These two coefficients are of equal and opposite magnitude. The kernel accentuates edges that extend transversely of the line between the two non-zero coefficients. For example, if the positive coefficient is at the upper left corner of the kernel and the negative coefficient is at the lower right corner, the kernel accentuates the edges that extend diagonally from the lower left corner of the luminance field to the upper right corner. If the resulting edge information array is combined with the original luminance field array, edges that are of positive polarity when the image array is traversed from the upper left corner to the lower right corner are highlighted and edges of negative polarity are shadowed, so that it appears that the scene represented by the enhanced luminance field is three-dimensional and is illuminated by a light source above and to the left of the viewer. Other permutations of this kernel allow simulation of a light source at other positions. However, the above-described 3×3 kernel cannot be used to simulate illumination other than along an axis which is horizontal or vertical or is at 45° to the horizontal and vertical axes. The effect of illumination at an arbitrary angle cannot be simulated by this method.

SUMMARY OF THE INVENTION

The above-described kernel and the permutations thereof calculate a central difference in luminance across a pixel at a location (u, v), i.e. the difference in luminance between two pixels that are neighbors of the pixel at the location (u, v) and are symmetrically disposed with respect to the location (u, v). The central difference is a function of direction, and the direction in which the central difference is calculated determines the direction of simulated illumination of the scene.

In a preferred embodiment of the invention, the central difference along a selected axis through the point (u, v) and at an arbitrary angle $\alpha$ to one of the coordinate axes is computed by interpolation. The octant in which the selected axis lies is identified, and first and second pixels through which the lines that limit the identified octant *extend* are identified. The first and second pixels are adjacent each other in the luminance field array and lie on a common ordinate or a common abscissa. [The difference between the luminance values of the first and second pixels is calculated.] Third and fourth pixels, which are symmetrically disposed with respect to the first and second pixels respectively about the point (u, v), are identified[, and the]. *The* difference in luminance values of the *first and* third [and fourth] pixels is calculated, *and the difference in luminance values of the second and fourth pixels is calculated*. The central difference along the selected axis is calculated by applying the MIX operator to the two difference values and a mix ratio coefficient which is the tangent of an angle which is related to $\alpha$ and multiplying the result by a factor proportional to the cosine of that angle.

BRIEF DESCRIPTION OF THE DRAWINGS

For a better understanding of the invention, and to show how the same may be carried into effect, reference will now be made, by way of example, to the accompanying drawings in which:

FIG. 1 illustrates how the central difference may be calculated for a point in a continuous luminance field, FIG. 2 illustrates diagrammatically a sampled luminance field, FIG. 3 illustrates a geometrical construction for use in calculating the central difference function for a grid point in a sampled luminance field.

DETAILED DESCRIPTION

Figure 5:
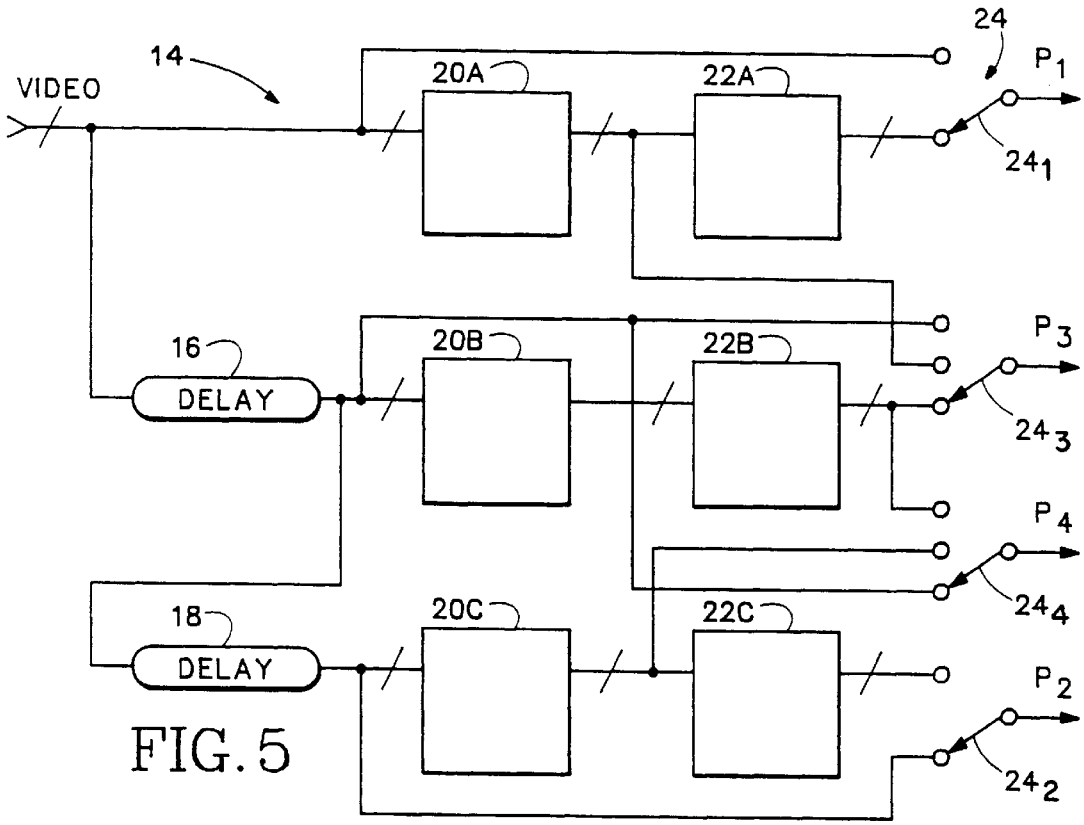
FIG. 5 is a more detailed block diagram of a part of the FIG. 4 circuit.

Referring to FIG. 1, the central difference about a point (0, 0) of a continuous, i.e. non-sampled, luminance field f(r, θ) is computed using the values of the luminance at two diametrically-opposite points (R,α) and (−R,α) on a circle centered at the point (0, 0). The central difference is $$[f(R, \alpha)-f(-R, \alpha)]/2R$$

R is a measure of the distance across which the difference is to be taken.

In a discrete image grid $P_{u,v}$ generated by sampling the continuous luminance field f(r, θ) uniformly at a sample interval R along the X (θ=0) and Y (θ=90°) axes, with the point (0, 0) coinciding with one of the grid points, the points (R,α) and (−R,[θ] α) do not exist except for θ=0 and θ=π/2. However, values of f(r,θ) can be synthesized for other values of [θ] α by interpolation from neighboring points. If R is set equal to one unit and 0<=θ<=π/4, the value of f(r, θ) at the point A (FIG. 3) at which an axis at an angle θ to the θ=0 axis intersects the grid line at u=1 is given by $$f(A)=MIX(P_{1,1},P_{1,0},k\mathbf{1}) \quad [1]$$

where MIX represents the linear interpolation operator:

$$MIX(A,B,K)=KA+(1-K)B,\ 0<=K<=1.$$

It can be shown that $$k\mathbf{1}=\tan\theta,\ 0<=\theta<=\pi/4$$

Thus $$f(A)=MIX(P_{1,1},\ P1,0,\ \tan\theta).$$

The value of $f(R,\theta)$ is obtained by interpolating between $P_{0,0}$ and $P_A$.

$$f(R,\theta)=MIX(P_{0,0},\ f(A),k\mathbf{2})$$

It can be shown that $$k2 = 1-\cos\alpha$$

Therefore, $$f(R,\ [\alpha]\Theta) = MIX(P_{0,0},\ f(A),\ 1-\cos\alpha) \quad [2]$$
$$= (1-\cos\alpha)P_{0,0} + \cos\alpha f(A)$$

In order to calculate the central difference function CDF $(\mathbf{0},\mathbf{0};\theta)$, it is necessary to calculate $f(-R,\theta)$ also. By symmetry, it can be shown that $$f(-A)=MIX(P_{-1,1},P_{-1,0},\tan\alpha)$$

$$f(-R,\alpha)=MIX(P_{0,0},f(-A),\ 1-\cos\alpha), \quad [3]$$

Then $$CDF(0,\ 0;\ \alpha) = (f(R,\ \alpha) - f(-R,\ \alpha))/2R \quad [4]$$
$$= (f(R,\ \alpha) - f(-R,\ \alpha))/2$$

On substituting for $f(R,\theta)$ and $f(-R,\theta)$ from equations [2] and [3] and expanding the MIX functions, terms including $P_{0,0}$ subtract out leaving $$CDF\ (\mathbf{0},\mathbf{0};\alpha)=(f(A)-f(-A))\cos\alpha/2$$

Substituting for f(A) and f(−A) gives $$CDF(0,\ 0;\ \alpha) = \cos\alpha(P_{1,1}\tan\alpha + (1-\tan\alpha)P_{1,0} - P_{-1,-1}\tan\alpha -$$
$$P_{-1,0}(1-\tan\alpha))/2$$
$$= \cos\alpha((P_{1,1} - P_{-1,-1})\tan\alpha +$$
$$(P_{1,0} - P_{-1,0})(1-\tan\alpha))/2$$
$$= \cos\alpha MIX((P_{1,1} - P_{-1,-1}),\ (P_{1,0} - P_{-1,0}),\ [)]\tan\alpha)/2$$

In general, $$CDF\ (\mathbf{0},\mathbf{0};\alpha)=\cos\beta MIX\ ((P_1-P_2),(P_3-P_4),\ \tan\beta)/2$$

where the values of $P_1$, $P_2$, $P_3$, $P_4$ and $\beta$ are obtained by symmetry and transposition properties and are given in the following table

TABLE

| $\alpha$ | $\beta$ | $P_1$ | $P_2$ | $P_3$ | $P_4$ |
|---|---|---|---|---|---|
| 0<=, <=π/4; | $\alpha$ | $P_{1,1}$ | $P_{-1,-1}$ | $P_{1,0}$ | [$P_{1,0}$] *$P_{-1,o}$* |
| π/4<, <=π/2 | (π/2-α) | $P_{1,1}$ | $P_{-1,-1}$ | $P_{0,1}$ | $P_{0,-1}$ |
| π/2<, <=3π/4 | [(α-π2)] *(α-π/2)* | $P_{-1,1}$ | $P_{1,-1}$ | $P_{0,1}$ | $P_{0,-1}$ |
| 3π/4<, <=π | (π-α) | $P_{-1,1}$ | $P_{1,-1}$ | $P_{-1,0}$ | $P_{1,0}$ |
| π<, <=5π/4 | α | $P_{1,1}$ | $P_{-1,-1}$ | $P_{1,0}$ | $P_{-1,0}$ |
| 5π/4<, <=3π/2 | (π/2-α) | $P_{1,1}$ | $P_{-1,-1}$ | $P_{0,1}$ | $P_{0,-1}$ |
| 3π/2<, <=7π/4 | (α-π2) | $P_{-1,1}$ | $P_{1,-1}$ | $P_{0,1}$ | $P_{0,-1}$ |
| 7π/4<, <2π | (π-α) | $P_{-1,1}$ | $P_{1,-1}$ | $P_{-1,0}$ | $P_{1,0}$ |

Figure 4:
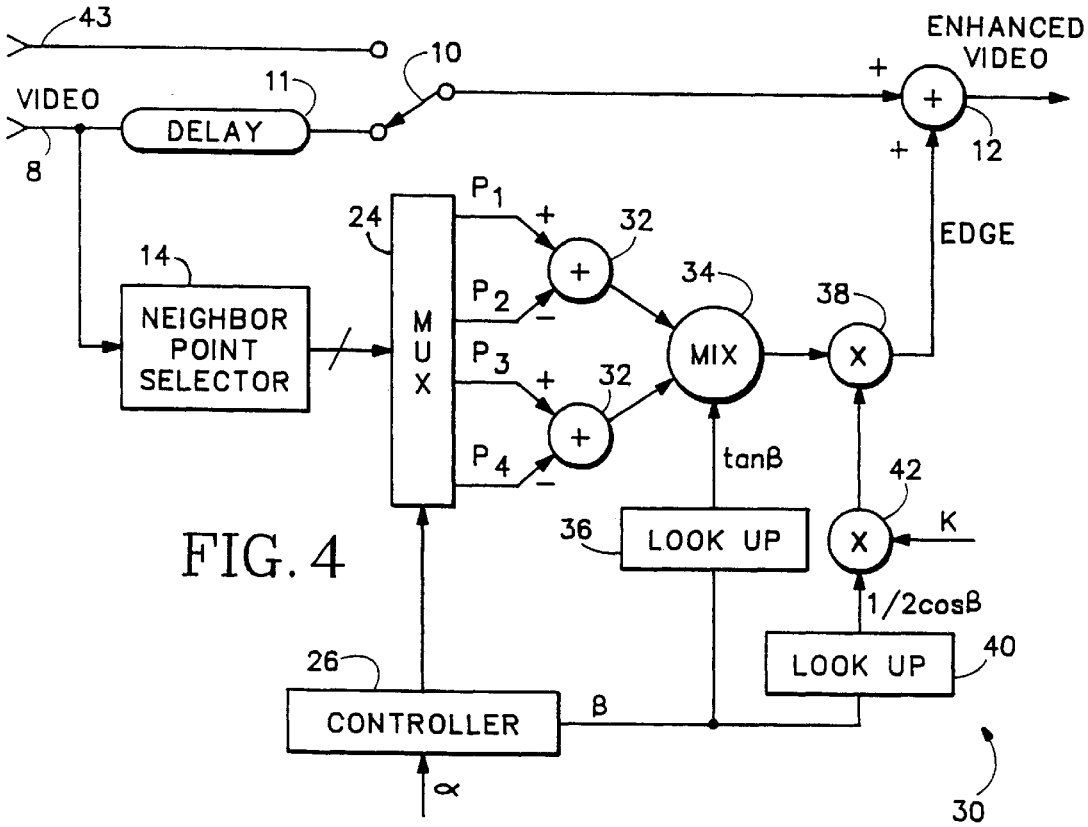
FIG. 4 is a block diagram of a circuit embodying the present invention.

The circuit shown in FIG. 4 illustrates how the foregoing mathematical analysis is applied to generation of an embossed video signal. The luminance component of a sampled video signal is applied to an input terminal 8 which is connected through a delay 11 and a switch 10 to one input terminal of a summation circuit 12 and is also connected to a neighbor point selector 14. The delay 11 interposes a delay of one line plus one sample interval. For the sake of simplicity, it is assumed that the spatial sampling frequencies of the video signal are the same in the horizontal and vertical directions and that the video signal is not interlaced. It is also assumed that the raster is scanned from left to right and from top to bottom. As shown in FIG. 5, the neighbor point selector 14 comprises two delays 16 and 18 which are connected in series and are tapped at three points (before the first delay, between the two delays and after the second delay. Each tap is connected to two registers 20, 22 which are connected in series and each of which serves as a one sample interval delay. The three taps and the output terminals of the registers 20A, 20C, 22A, 22B and 22C are connected to a multiplexer 24 which comprises four switches having terminals designated $P_1$, $P_2$, $P_3$ and $P_4$ respectively.

A controller 26 receives a signal representative of the angle [θ] α for which the central difference function is to be computed. The controller 26 determines what value of β and which neighbor points should be used to generate the central difference function, in accordance with the table. For example, when [θ] α is in the range from 90° to 135°, the controller 26 controls the multiplexer [4] *24* so that the switches $\mathbf{24}_1$, $\mathbf{24}_2$, $\mathbf{24}_3$ and $\mathbf{24}_4$ select, respectively, the [output] *input* terminal of the [register 22A] *neighbor point selector 14*, the output terminal of the [line delay 18] *register 22C*, the output terminal of the register 20A, and the output terminal of the register 20C. The selected signals are applied to a central difference function generator 30 which also receives a signal representative of the value of β from the address control 26. The CDF generator 30 comprises a pair of summation circuits 32 which form two difference signals $P_1$–$P_2$ and $P_3$–$P_4$. The difference signals are applied to a mixer 34 which receives a value of tan β from a look-up table 36. The mixer 34 generates MIX $((P_1-P_2),(P_3-P_4),$ tan β). The output signal of the mixer 34 is applied to a multiplier 38. The signal β from the controller 26 is applied to a look-up table 40 which provides an output signal ½ cos β. The signal ½ cos β is multiplied by a factor K in a multiplier 42, the output signal of which is applied as the second input to the multiplier 38. Thus, the output signal of the multiplier 38 is $$K\cos\beta MIX((P_1 - P_2), (P_3 - P_4), \tan\beta)/2$$

or, in the case of the example, $$[K\cos(\alpha - \pi/2)MIX((P_{1,1} - P_{1,-1}), (P_{0,1} - P_{0,-1}), \tan(\alpha - \pi/2))/2]$$

$$\underline{K\cos(\alpha - \pi/2)MIX((P_{-1,1} - P_{1,-1}), (P_{0,1} - P_{0,-1}), \tan(\alpha - \pi/2))/2}$$

where K functions as a "strength" factor and controls the intensity of highlight insertion.

This output signal is proportional to the central difference function across the pixel represented by the output signal of the delay 11 at an angle [θ] α to the θ=0 axis, and therefore is positive for edges of positive polarity and negative for edges of negative polarity. The output signal of the multiplier 38 is applied to the second input of the summation circuit 12, and the result is the output signal of the circuit 12 simulates an embossed effect.

It is not necessary that the highlights and shadows generated by the embossing circuit be added to the same video signal as is used to generate the highlights and shadows. By setting the switch 10 to select a signal applied to the terminal 43, the highlights and shadows may be applied to a different scene.

Figure 6:
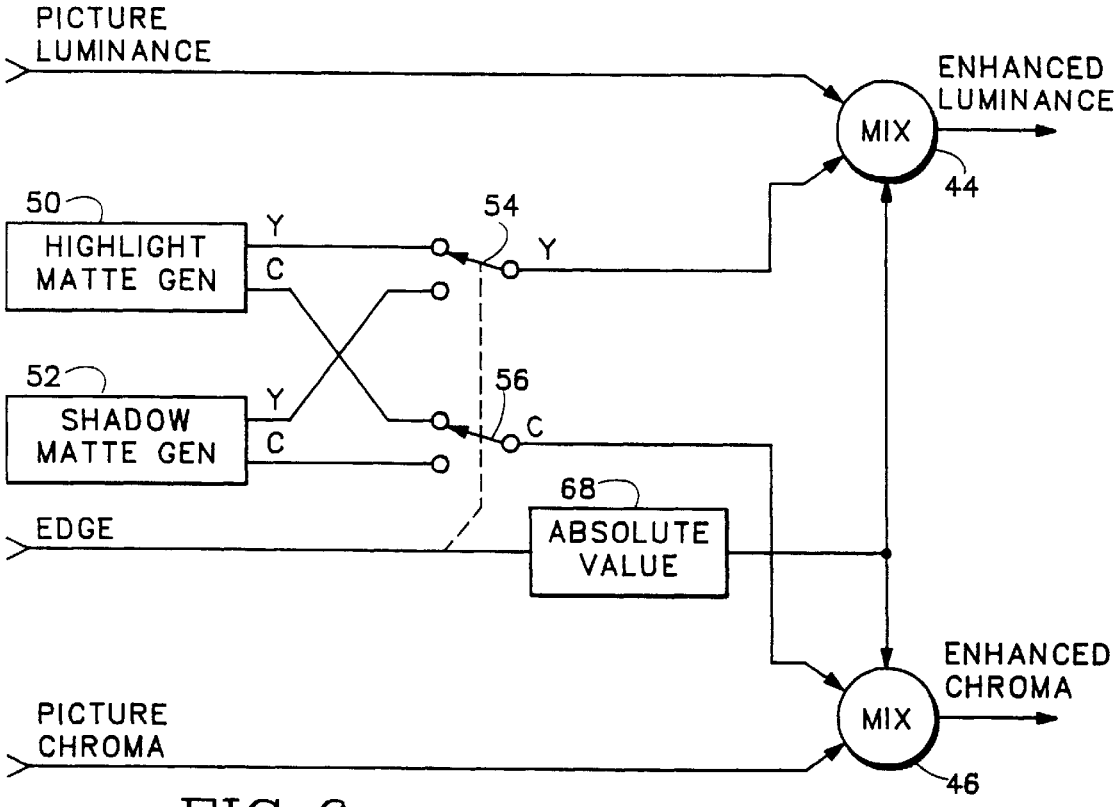
FIG. 6 is a block diagram of a modified form of part of the FIG. 4 circuit.

A disadvantage of the circuit illustrated in FIGS. 4 and 5 is that by simply adding the edge signal and the luminance signal, the output signal may be outside the valid signal range. This may be compensated by clipping the output signal provided by the circuit 12 to limit its range, but the clipping operation may cause a form of aliasing. In the modified circuit shown in FIG. 6, the edge signal is used to control mixing of highlights and shadows into the picture signal, and therefore the possibility of the output signal being outside the valid video signal range is avoided. As shown in FIG. 6, luminance and chrominance components of an input video signal are applied to video inputs of respective mixers 44 and 46. Matte generators 50 and 52 generate matte signals representative of solid colors. In order to provide a highlight/shadow type of embossing effect, the matte generator 50 would generate a signal representing white or a color close to white and the matte generator 52 would generate a signal representing black or a color close to black. However, different colors may instead be generated. The luminance and chrominance components of the matte signals are applied to selector switches 54 and 56, one of which is connected to the second video input of the luminance mixer 44 and the other of which is connected to the second video input of the chrominance mixer 46. The edge signal provided by the multiplier 38 (FIG. 4) has a sign bit which is used to control the switches 54 and 56: if the sign bit indicates positive sign, the switches 54 and 56 select the highlight matte generator; if negative, the shadow matte generator. The edge signal is applied to an absolute value circuit which provides positive mix ratio value signals to the mixers 44 and 46. The mixer 44 combines the luminance component provided by the selected matte generator with the input luminance component in dependence on the mix ratio to provide an enhanced luminance component, and the mixer 46 operates in similar fashion to provide an enhanced chrominance component. The enhanced luminance and chrominance components are then combined. As the mix ratio increases from zero, highlight or shadow is mixed into the input video depending on whether the matte generator 50 or 52 is selected.

If the spatial sampling frequency in the horizontal direction is not the same as the spatial sampling frequency in the vertical direction, the locus of points for which the luminance is calculated will not be a circle. The result is that the amount by which an edge is enhanced is dependent on the direction for which the central difference function is calculated. The horizontal spatial sampling frequency normally used in digital processing of television signals is approximately twice the vertical spatial sampling frequency. Accordingly, in application of the present invention to television, it is preferred that the sample values used to calculate the central difference function for the mth pixel in line n be selected from the (m−2)th, mth and (m+2)th samples in each of lines (n−1) and (n+1) and the (m−2)th and (m+2)th samples in line n.

It will be appreciated that the present invention is not restricted to the particular embodiments that have been described, and that variations may be made therein without departing from the scope of the invention as defined in the appended claims and equivalents thereof. For example, use of the combiner circuit shown in FIG. 6 is not restricted to the edge signal generator shown in FIGS. 4 and 5, and may be used in conjunction with the edge signal generator discussed in the background portion of the specification. Similarly, the edge signal generated by the edge signal generator shown in FIGS. 4 and 5 may be combined with a picture signal otherwise than through use of the combiner shown in FIG. 6.

I claim:

1. A method of processing a signal representative of a rectangularly-sampled field $f_{u,v}$ comprising:

(a) for each sample point (u, v) of the luminance field (i) forming a first value equal to the difference between a sample value for a first neighbor point of which one coordinate is equal to the corresponding coordinate of the point (u, v) and of which the other coordinate is different from the corresponding coordinate of the point (u, v) and a sample value for a second neighbor point [of which one coordinate is the same as the corresponding coordinate of the first neighbor point and of which the other coordinate is different from the corresponding coordinates of both the point (u, v) and the first neighbor point] *which is symmetrically disposed with respect to the first neighbor point about the point* (*u, v*), (ii) forming a second value equal to the difference between a sample value for a third neighbor point [which is symmetrically disposed with respect to the first neighbor point about the point (u, v)] and a sample value for a fourth neighbor [which is] *point, the third neighbor point having one coordinate that is the same as the corresponding coordinate of the first neighbor point and another coordinate that is different from the corresponding coordinates of both the point* (*u, v*) *and the first neighbor point, and the fourth neighbor point being* symmetrically disposed with respect to the [second] *third* neighbor point about the point (u, v), and (iii) forming a weighted sum of the first and second values, (b) forming a rectangular edge array of values $s_{u,v}$ representing the weighted sum formed in step (a) for each point (u,v), and (c) combining the rectangular edge array $s_{u,v}$ with a rectangularly-sampled field $g_{u,v}$ to provide an output array $q_{u,v}$.

2. A method according to claim 1, wherein the field $f_{u,v}$ is the same as the field $g_{u,v}$.

3. A method according to claim 1, wherein the weighted sum of the first and second values is formed by multiplying the first value by a weighting coefficient k (0<=k<=1), multiplying the second value by the complement of k, and summing the two multiplication products thereby formed.

4. A method according to claim 3, comprising multiplying the sum of the two multiplication products by a factor proportional to [cosθ] *cos*α, where [θ] α=arctan k, in order to form $s_{u,v}$.

5. A method according to claim 1, wherein the array $s_{u,v}$ is combined with the field $g_{u,v}$ by additive combination.

6. A method according to claim 1, wherein the array $s_{u,v}$ is combined with the field $g_{u,v}$ by using the array $s_{u,v}$ as a mixing coefficient to control mixing of the field $g_{u,v}$ with at least one other field $p_{u,v}$.

7. A method according to claim 1, wherein the field $p_{u,v}$ is a luminance field.

8. A method according to claim 6, wherein the step of combining the array $s_{u,v}$ and the field $g_{u,v}$ comprises:

mixing the field $g_{u,v}$ with the field $p_{u,v}$ for positive values of $s_{u,v}$, and mixing the field $g_{u,v}$ with a field $r_{u,v}$ for negative values of $s_{u,v}$.

9. A method according to claim 8, wherein the field $r_{u,v}$ is a luminance field.

10. A method according to claim 1, wherein the fields $f_{u,v}$ and $g_{u,v}$ are luminance fields.

11. A method of processing a signal representative of a rectangularly-sampled video component field $f_{u,v}$ comprising:

(a) for each sample point (u, v) of the field (i) forming a first value equal to the difference between a sample value for a fist neighbor point of which one coordinate is equal to the corresponding coordinate of the point (u, v) and of which the other coordinate is different from the corresponding coordinate of the point (u, v) and a sample value for a second neighbor point [of which one coordinate is the same as the corresponding coordinate of the first neighbor point and of which the other coordinate is different from the corresponding coordinates of both the point (u, v) and the first neighbor point] *which is symmetrically disposed with respect to the first neighbor point about the point* (*u, v*), (ii) forming a second value equal to the difference between a sample value for a third neighbor point [which is symmetrically disposed with respect to the first neighbor point about the point (u, v)] and a sample value for a fourth neighbor [which is] *point, the third neighbor point having one coordinate that is the same as the corresponding coordinate of the first neighbor point and another coordinate that is different from the corresponding coordinates of both the point* (*u, v*) *and the first neighbor point, and the fourth neighbor point being* symmetrically disposed with respect to the [second] *third* neighbor point about the point (u, v), and (iii) forming a weighted sum of the first and second values, (b) forming a rectangular edge array of values $s_{u,v}$ representing the weighted sum formed in step (a) for each point (u,v), and (c) combining the rectangular edge array $s_{u,v}$ with a rectangularly-sampled field $g_{u,v}$ to provide an output array $q_{u,v}$.

12. A method according to claim 11, wherein the field $f_{u,v}$ is the same as the field $g_{u,v}$.

13. A method of processing a signal representative of a rectangularly-sampled video component field $f_{u,v}$, comprising:

forming a rectangular array of values $s_{u,v}$ representing the polarity of edges in the field $f_{u,v}$, and combining the array $s_{u,v}$ with a rectangularly-sampled video field $g_{u,v}$ by using the array $s_{u,v}$ as a mixing coefficient to control mixing of the field $g_{u,v}$ with at least one other field $p_{u,v}$.

14. A method according to claim 13, wherein the array $s_{u,v}$ is combined with the field $g_{u,v}$ by using the array $s_{u,v}$ as a mixing coefficient to control mixing of the field $g_{u,v}$ with at least one other field $p_{u,v}$.

15. A method according to claim 13, wherein the field $f_{u,v}$ is the same as the field $g_{u,v}$.

16. Apparatus for processing a signal representative of a rectangularly-sampled video component field $f_{u,v}$, comprising:

means for forming, for each sample point (u, v) of the field, a first value equal to the difference between a sample value for a first neighbor point of which one coordinate is equal to the corresponding coordinate of the point (u, v) and of which the other coordinate is different from the corresponding coordinate of the point (u, v) and a sample value for a second neighbor point [of which one coordinate is the same as the corresponding coordinate of the first neighbor point and of which the other coordinate is different from the corresponding coordinates of both the point (u, v) and the first neighbor point] *which is symmetrically disposed with respect to the first neighbor point about the point* (*u, v*), and forming a second value equal to the difference between a sample value for a third neighbor point [which is symmetrically disposed with respect to the first neighbor point about the point (u, v)] and a sample value for a fourth neighbor point [which is], *the third neighbor point having one coordinate that is the same as the corresponding coordinate of the first neighbor point and another coordinate that is different from the corresponding coordinates of both the point* (*u, v*) *and the first neighbor point, and the fourth neighbor point being* symmetrically disposed with respect to the second neighbor point about the point (u, v), means for forming a weighted sum of the first and second values, and means for combining a rectangular array of sample values $s_{u,v}$ representing the weighted sum for each point (u, v) with a rectangularly-sampled video component field $g_{u,v}$.

* * * * *